(12) United States Patent
Panteleev et al.

(10) Patent No.: US 9,367,946 B2
(45) Date of Patent: Jun. 14, 2016

(54) COMPUTING SYSTEM AND METHOD FOR REPRESENTING VOLUMETRIC DATA FOR A SCENE

(71) Applicant: Nvidia Corporation, Santa Clara, CA (US)

(72) Inventors: Alexey Panteleev, Moscow (RU); Yury Uralsky, Santa Clara, CA (US); Evgeny Makarov, Moscow (RU); Henry Moreton, Santa Clara, CA (US); Sergey Bolotov, Moscow (RU); Eric Lum, Santa Clara, CA (US); Alexey Barkovoy, Moscow (RU); Cyril Crassin, Paris (FR)

(73) Assignee: NVIDIA CORPORATION, Santa Clara, CA (US)

( * ) Notice: Subject to any disclaimer, the term of this patent is extended or adjusted under 35 U.S.C. 154(b) by 79 days.

(21) Appl. No.: 14/163,860

(22) Filed: Jan. 24, 2014

(65) Prior Publication Data

US 2015/0109298 A1   Apr. 23, 2015

Related U.S. Application Data

(60) Provisional application No. 61/892,288, filed on Oct. 17, 2013, provisional application No. 61/892,316, filed on Oct. 17, 2013.

(51) Int. Cl.
*G06T 15/08*   (2011.01)
*G06T 15/00*   (2011.01)
*G06T 15/20*   (2011.01)
*G06T 15/80*   (2011.01)

(52) U.S. Cl.
CPC ............... *G06T 15/005* (2013.01); *G06T 15/08* (2013.01); *G06T 15/20* (2013.01); *G06T 15/80* (2013.01)

(58) Field of Classification Search
None
See application file for complete search history.

(56) References Cited

U.S. PATENT DOCUMENTS 6,567,083 B1 *   5/2003   Baum et al. ................... 345/426

OTHER PUBLICATIONS

John Whigham, "John Whigham's Blog: Goodbye Octrees," http://johnwhigham.blogspot.com/2013/06/goodbye-octrees.html , Jun. 18, 2013.*
Thiedemann et al., "Voxel-based Global Illumination" ACM 2011.*
Forest et al., "Real-Time Hierarchical Binary-Scene Voxelization," A K Peters, Ltd., 2010.*
Reinbothe et al., "Hybrid Ambient Occlusion," Eurographics, 2009.*

* cited by examiner

*Primary Examiner* — Kee M Tung
*Assistant Examiner* — Nicholas R Wilson

(57) ABSTRACT

A computing system and method for representing volumetric data for a scene. One embodiment of the computing system includes: (1) a memory configured to store a three-dimensional (3D) clipmap data structure having at least one clip level and at least one mip level, and (2) a processor configured to generate voxelized data for a scene and cause the voxelized data to be stored in the 3D clipmap data structure.

18 Claims, 4 Drawing Sheets

COMPUTING SYSTEM AND METHOD FOR REPRESENTING VOLUMETRIC DATA FOR A SCENE

CROSS-REFERENCE TO RELATED APPLICATION

Figure 1:
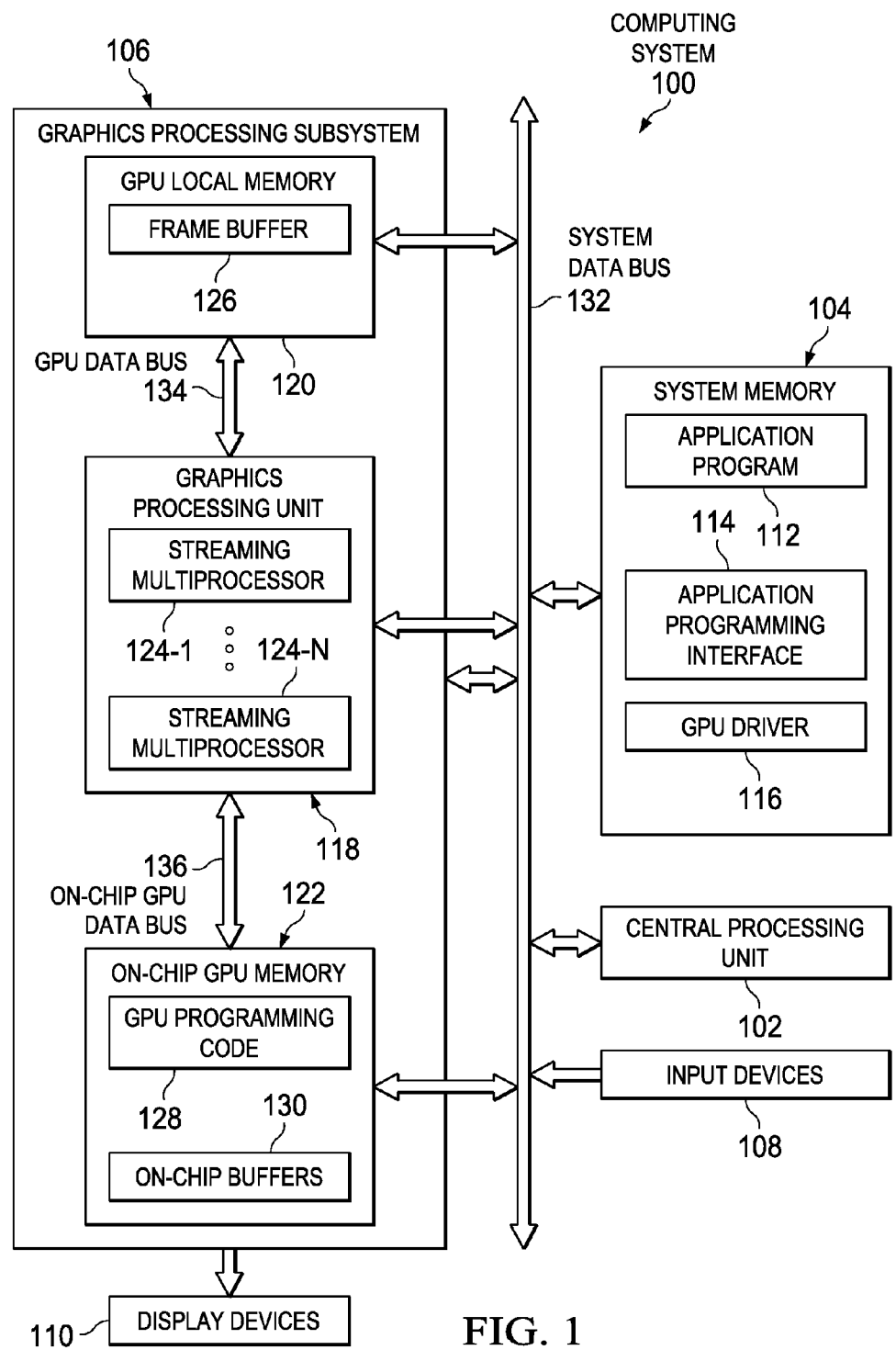
Figure 2A:
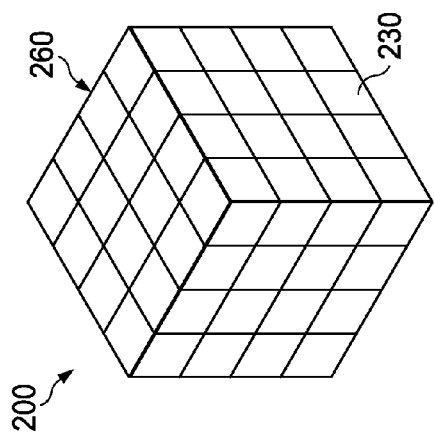
Figure 2B:
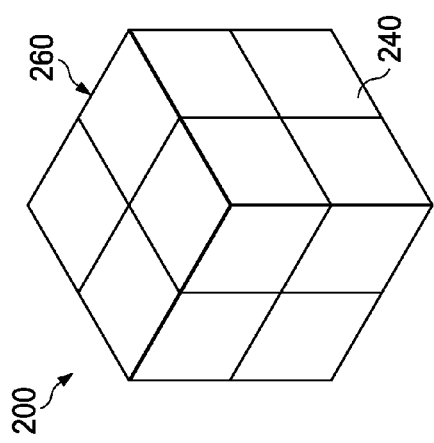
Figure 2C:
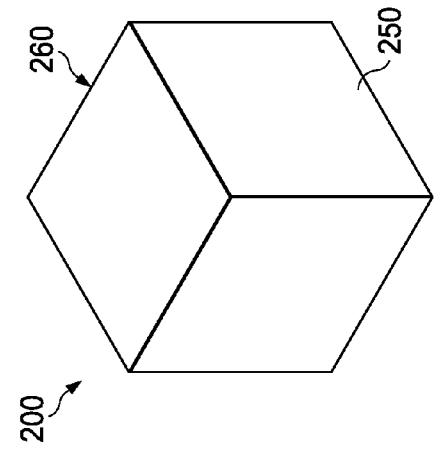
Figure 2D:
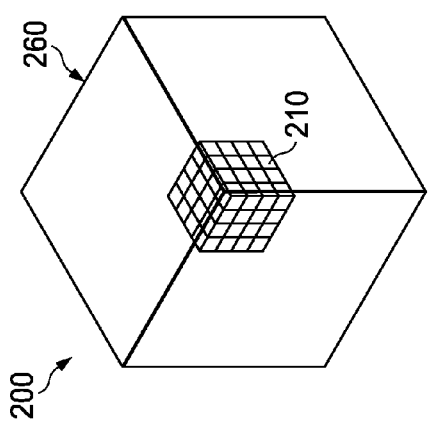
Figure 2E:
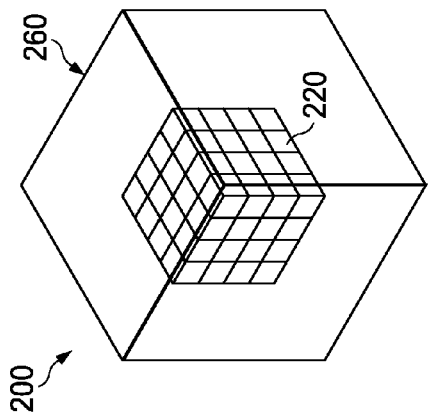

This application claims the benefit of U.S. Provisional Application Ser. No. 61/892,288, filed by Bolotov, et al., on Oct. 17, 2013, entitled "A Method for Optimizing Regions for Voxelization Updates," and U.S. Provisional Application Ser. No. 61/892,316, filed by Bolotov, et al., on Oct. 17, 2013, entitled "Using Clipmaps to Represent Volumetric Data for GI and AO Algorithms," commonly assigned with this application and incorporated herein by reference.

TECHNICAL FIELD

This application is directed, in general, to representing volumetric data for a three-dimensional (3D) scene and, more specifically, to using a 3D clipmap to represent the volumetric data.

BACKGROUND

Many computer graphic images are created by mathematically modeling the interaction of light with a 3D scene from a given viewpoint. This process, called "rendering," generates a two-dimensional (2D) image of the scene from the given viewpoint and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

A variety of shading programs are directed at modeling illumination in a scene. The physical plausibility of rendered illumination often depends on the application, more specifically, whether or not the rendering is done in real-time. Physically plausible illumination at real-time frame rates is often achieved using approximations. For example, ambient occlusion is a popular approximation because of its high speed and simple implementation. Another example is directional occlusion. Many algorithms can only approximate direct illumination, which is light coming directly from a light source.

Global illumination, or GI, is a concept that accounts for both direct illumination and indirect illumination, which is light that reflects off other surfaces, in rendering the scene. In doing so, a significantly more realistic image is achievable. However, real-time global illumination remains problematic for large and dynamic scenes. Efforts to mitigate the latency introduced by these comprehensive illumination algorithms are ongoing. For example, some algorithms partially precompute illumination. Another example is instant radiosity, which models indirect lighting as a set of point lights, the contributions of which are accumulated over multiple rendering passes. Yet another approach is to limit indirect lighting to a single bounce, under the assumption that one-bounce indirect illumination is sufficiently realistic. Still, real-time frame rates are typically only achievable through approximations.

Ambient occlusion, or AO, is an example of a shading algorithm, commonly used to add a global illumination look to rendered images. AO is not a natural lighting or shading phenomenon. In an ideal system, each light source would be modeled to determine precisely the surfaces it illuminates and the intensity at which it illuminates them, taking into account reflections, refractions, scattering, dispersion and occlusions. In computer graphics, this analysis is accomplished by ray tracing or "ray casting." The paths of individual rays of light are traced throughout the scene, colliding and reflecting off various surfaces.

In non-real-time applications, each surface in the scene can be tested for intersection with each ray of light, producing a high degree of visual realism. This presents a practical problem for real-time graphics processing: rendered scenes are often very complex, incorporating many light sources and many surfaces, such that modeling each light source becomes computationally overwhelming and introduces large amounts of latency into the rendering process. AO algorithms address the problem by modeling light sources with respect to an occluded surface in a scene: as white hemispherical lights of a specified radius, centered on the surface and oriented with a normal vector at the occluded surface. Surfaces inside the hemisphere cast shadows on other surfaces. AO algorithms approximate the degree of occlusion caused by the surfaces, resulting in concave areas such as creases or holes appearing darker than exposed areas. AO gives a sense of shape and depth in an otherwise "flat-looking" scene.

The most realistic AO techniques are global; the illumination at each point is a function of other geometry in the scene. Screen-space AO (SSAO) can render only local effects and therefore fails to recognize the more subtle illuminations that lend realism. For this reason, SSAO will not be further described herein.

Several methods are available to compute global AO, but its sheer computational intensity makes it an unjustifiable luxury for most real-time graphics processing systems. To appreciate the magnitude of the effort AO entails, consider a given point on a surface in the scene and a corresponding hemispherical normal-oriented light source surrounding it. The illumination of the point is approximated by integrating the light reaching the point over the hemispherical area. The fraction of light reaching the point is a function of the degree to which other surfaces obstruct each ray of light extending from the surface of the sphere to the point.

SUMMARY

One aspect provides a computing system. In one embodiment, the system includes: (1) a memory configured to store a three-dimensional (3D) clipmap data structure having at least one clip level and at least one mip level, and (2) a processor configured to generate voxelized data for a scene and cause the voxelized data to be stored in the 3D clipmap data structure.

Another aspect provides a method of representing volumetric data for a scene. In one embodiment, the method includes: (1) voxelizing the scene into a 3D clipmap centered about a viewpoint, and (2) employing the 3D clipmap in computing an effect for the viewpoint.

Yet another aspect provides a graphics processing subsystem. In one embodiment, the subsystem includes: (1) a memory configured to store a three-dimensional (3D) clipmap having a plurality of levels of detail (LODs), and (2) a graphics processing unit (GPU) coupled to the memory and configured to: (2a) voxelize a scene, thereby generating the 3D clipmap, including at least one clip level and at least one mip level, and (2b) cause the at least one clip level and the at least one mip level to be respectively written to the memory.

BRIEF DESCRIPTION

Figure 3:
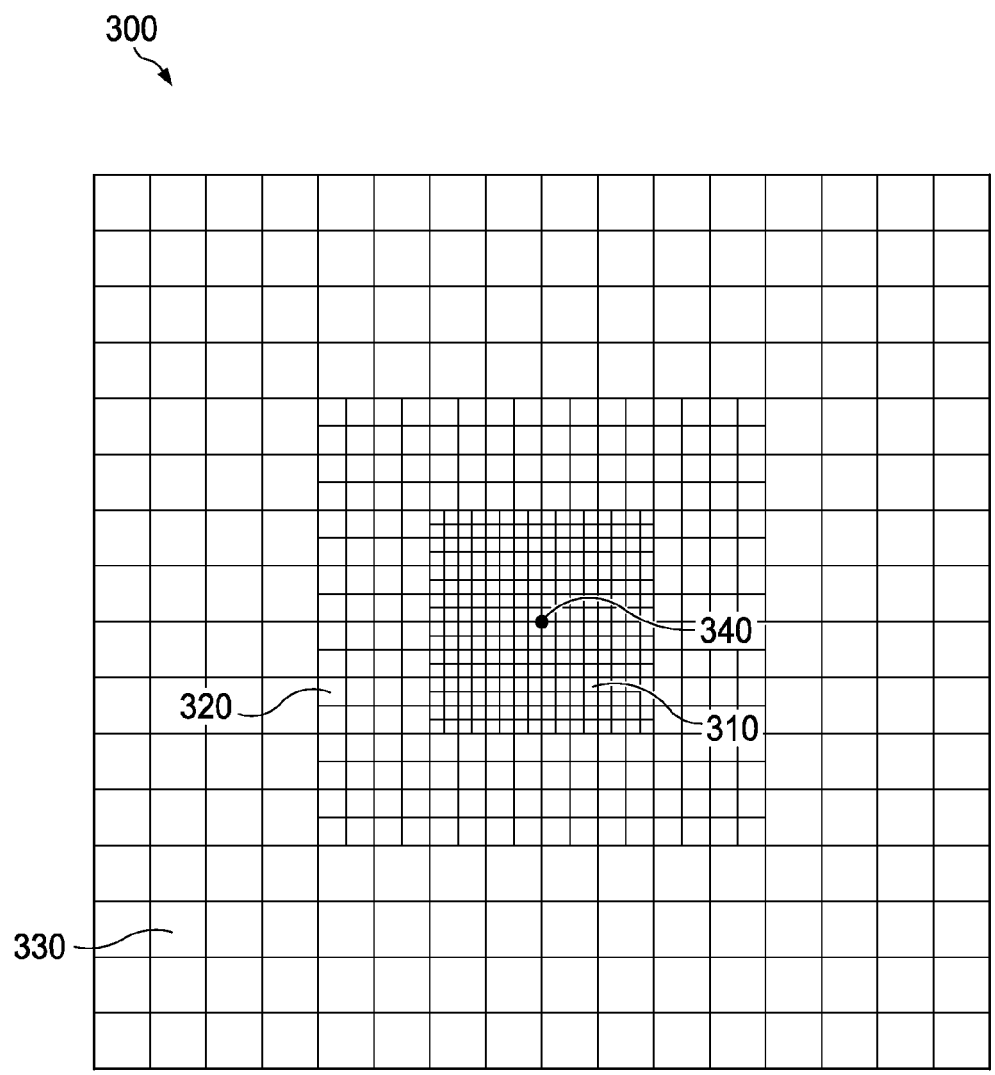
Figure 4:
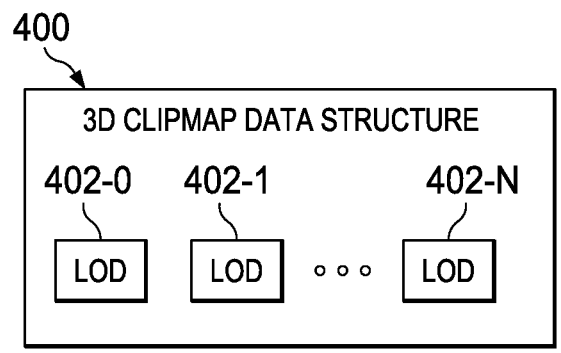
Figure 5:
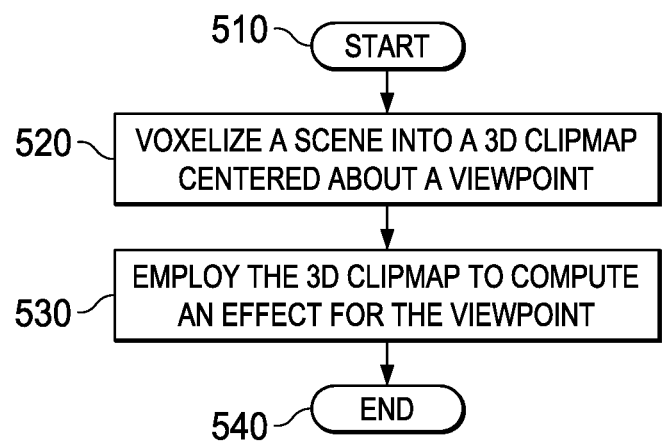

Reference is now made to the following descriptions taken in conjunction with the accompanying drawings, in which:
FIG. 1 is a block diagram of one embodiment of a computing system;
FIGS. 2A-2E are illustrative diagrams of one embodiment of a 3D clipmap;
FIG. 3 is a 2D view of one embodiment of a 3D clipmap;
FIG. 4 is a block diagram of one embodiment of a 3D clipmap data structure; and
FIG. 5 is flow diagram of one embodiment of a method of representing volumetric data for a 3D scene.

DETAILED DESCRIPTION

A mipmap is a collection of correlated images of increasingly reduced resolution. "Mip" is actually an acronym representing the Latin phrase "multum in parvo," meaning "much in little." Mipmaps are often described as resolution pyramids, starting with level zero, the largest and finest level. Each lower level represents the image using half as many texels in each dimension. Consequently, for a two-dimensional (2D) image, each lower level consumes one-quarter of the memory required for the level above. For a 3D volume, each lower level consumes one-eighth the memory required for the level above. Rendering processes can gain access to the various levels of detail (LODs) to use the texels contained therein to render an image. Mipmaps are intended to increase rendering speed and reduce aliasing.

A clipmap is a representation of a partial mipmap in which the finest levels are clipped to a specified maximum size. Rather than the pyramidal shape seen in mipmaps, the clipmap more resembles an obelisk. Clipped levels are referred to as clip levels and unclipped levels are referred to as mip levels. A clipmap has at least one mip level and at least one clip level. The mip levels of a clipmap represent the same spatial region of a scene with increasing resolution, beginning with the coarsest level. Each of the clip levels has the same resolution that is equal to the resolution of the finest mip level. While the clip levels maintain a constant resolution across the corresponding LODs, the respective spatial regions represented shrink as the LODs become finer. This representation reduces the amount of memory required to represent parts of the scene with high spatial resolution and cover a large region of the scene at the same time.

Clipmaps resulted from the realization that the majority of a mipmap is not used to render a single frame of a scene. In fact, the viewpoint and display resolution determine the part of the mipmap that is used to render a frame. The clipmap is intended to be the minimal subset of the mipmap needed to render each frame. Thus clipmaps should be updated as frames change over time. For this reason, practical clipmaps are updatable.

It is realized herein the clipmap data structure should be expanded to represent volumetric data for a 3D scene. Volumetric data is packaged in a volumetric pixel, or "voxel." Clipmaps were originally implemented as 2D mipmaps with the finest levels clipped such that they have the same number of texels, but cover different size spatial regions. It is realized herein a 3D clipmap has advantages over alternative representations, such as a sparse voxel octree, in that it can be updated more quickly and more quickly sampled than an octree.

Generally, graphics processing hardware, e.g., GPUs, does not support use of 3D clipmaps. It is realized herein that 3D clipmaps can be efficiently implemented on GPUs that provide direct control over virtual memory. In certain embodiments, it is realized herein, 3D clipmaps can be implemented on GPUs lacking support for 2D clipmaps. It is realized herein that a 3D mipmap texture can be created to store the 3D clipmap. Each level of the 3D mipmap data structure contains memory pages in which voxels are stored. Most of the memory pages the 3D mipmap refers to are unmapped when storing a 3D clipmap. Only the regions of the 3D mipmap that correspond to regions in the 3D clipmap are mapped.

Clipmaps can be used in many graphics rendering processes, including ambient occlusion and global illumination. To evaluate a viewpoint in a particular scene, the scene is voxelized to form a clipmap that is centered on or, in some embodiments, slightly offset from, the viewpoint. Generally, when computing an effect on the viewpoint, geometry that is further from the viewpoint has less impact on the computation than nearer geometry. When processing the viewpoint, samples are taken from the various LODs of the clipmap. Nearer samples are taken from the finer LODs, and distant samples are taken from the coarser LODs.

Before describing various embodiments of the graphics processing subsystem and method of representing volumetric data for a scene introduced herein, a computing system within which the graphics processing subsystem or method maybe embodied or carried out will be described.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special-purpose processing unit or coprocessor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random-access memory (DRAM) employed to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a graphics processing unit (GPU) driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within which the graphics processing subsystem and method of computing an effect for a viewpoint in a scene may be embodied or carried out, various embodiments of the graphics processing subsystem and method will be described.

FIGS. 2A-2E are illustrative diagrams of one embodiment of a 3D clipmap 200. 3D clipmap 200 includes five LODs. Three LODs are mip levels, including mip level 250, mip level 240, and mip level 230. Two of the five LODs are clip levels, which include clip level 220 and clip level 210. Alternate embodiments of 3D clipmap 200 can include any number of mip levels and clip levels, so long as it includes at least one clip level and at least one mip level. The coarsest LOD in 3D clipmap 200 defines the spatial extents of the spanned region, a volume 260, making it a mip level. The finest LOD in 3D clipmap 200 must be a clip level, otherwise 3D clipmap 200 would simply be a mipmap.

Mip level 250 is the coarsest LOD in 3D clipmap 200 and includes a single voxel that represents the full spatial extent spanned by 3D clipmap 200, volume 260. Consequently, mip level 250 requires the least memory to store. Mip level 240 doubles the resolution in each dimension with respect to mip level 250, making the resolution eight voxels. Mip level 230 again doubles the resolution in each dimension with respect to mip level 240, making the resolution 64 voxels. As resolution increases from mip level 250, to mip level 240, to mip level 230, the memory necessary to store those LODs also increases. The spatial regions, or volumes, spanned by mip level 250, mip level 240, and mip level 230 are the same.

Clip level 220 maintains the 64 voxel resolution of mip level 230, increases the detail represented, and decreases the spatial region represented by the LOD. In a 3D mipmap representation, the resolution would again double in each dimension. However, 3D clipmap 200 clips voxels outside the maximum size for each dimension, thereby leaving a portion of the full spatial extent, volume 260, unrepresented in clip level 220. Clip level 220 is centered about a viewpoint, which is located where the octants of clip level 220 meet.

Clip level 210 is the finest LOD in 3D clipmap 200 and also maintains the 64 voxel resolution of mip level 230 and clip level 220. Clip level 210 increases the detail represented relative to clip level 220 and decreases the spatial region represented by the LOD. Clip level 210 leaves a larger portion of the full spatial extent, volume 260, unrepresented than clip level 220 and is centered about the same viewpoint.

FIG. 3 is a 2D view of one embodiment of a 3D clipmap 300. The 2D view is a helpful simplification for illustrating how 3D clipmaps can be used to compute effects, such as AO and GI. Clipmap 300 is centered about a viewpoint 340. Viewpoint 340 is then surrounded by resolution bands, sometimes referred to as "rings of texture resolution." For 3D clipmap 300, those bands are actually resolution cubes. The inner-most resolution cube is resolution cube 310, which is the finest LOD in clipmap 300. It provides the most detail for computing an effect on viewpoint 340, but spans only a portion of the full spatial extent of clipmap 300. The next resolution cube is a resolution cube 320. Resolution cube 320 has the same resolution as resolution cube 310, provides less detail for computing an effect on viewpoint 340, and spans a spatial region, or volume, that is eight times larger than that spanned by resolution cube 310. Likewise, a resolution cube 330 maintains the resolution of resolution cube 320 and resolution cube 310, and spans a volume that is eight times larger than that spanned by resolution cube 320. Resolution cube 340 also defines the spatial extents of clipmap 300.

The mip levels of 3D clipmap 300 would span the same volume spanned by resolution cube 330. Each successive mip level reduces the resolution by one-half in each dimension relative to resolution cube 330, resolution cube 320, and resolution cube 310.

FIG. 4 is a block diagram of one embodiment of a 3D clipmap data structure 400. 3D clipmap data structure 400 includes N LODs, LOD 402-0, and LOD 402-1 through LOD 402-N. LOD 402-0 is the finest LOD in 3D clipmap data structure 400. LOD 402-1 contains the same number of voxels as LOD 402-0 and represents a spatial region that is eight times larger than that represented by LOD 402-0. LOD 402-N is the coarsest LOD in 3D clipmap data structure 400 and is a mip level, meaning it represents the full spatial extent of the spatial region represented by 3D clipmap data structure 400.

FIG. 5 is a flow diagram of one embodiment of a method of representing volumetric data for a 3D scene. The method begins in a start step 510. In a voxelization step 520, the scene is voxelized into a 3D clipmap centered about a viewpoint. In certain embodiments, the 3D mipmap can be stored in a 3D mipmap data structure. The 3D mipmap data structure contains sufficient memory pages to store the full 3D mipmap, however, the 3D clipmap requires only a fraction of those memory pages. Each clip level of the 3D clipmap leaves a portion of the memory pages available to that LOD unmapped, or empty. This allows graphics hardware that would otherwise not support 3D clipmaps to utilize 3D clipmaps.

Continuing the embodiment of FIG. 5, as the scene changes or as the viewpoint moves, the 3D clipmap can be updated by re-voxelizing the updated scene. The 3D clipmap generated by voxelizing the scene is then employed in a computation step 530. At computation step 530, the 3D clipmap is used to compute an effect for the viewpoint about which voxelization was centered in voxelization step 520. In certain embodiments, the 3D clipmap is employed in computing an AO value for the viewpoint. In other embodiments, the 3D clipmap is employed in computing a GI value for the viewpoint. Access to the 3D clipmap is based on the position of the viewpoint and the resolution of the frames to be displayed. Geometry nearest the viewpoint typically contributes most to the effect to be computed. As such, the 3D clipmap provides the finest LOD nearest the viewpoint. As geometry is sampled that is further from the viewpoint, access is had to other LODs that provide less detail. The 3D clipmap is re-voxelized as the viewpoint moves such that the finest LOD is centered at the viewpoint. In alternate embodiments, the 3D clipmap is re-voxelized such that the finest LOD is slightly offset from the viewpoint. The method then ends in an end step 540.

Those skilled in the art to which this application relates will appreciate that other and further additions, deletions, substitutions and modifications may be made to the described embodiments.

What is claimed is:

1. A computing system, comprising:
   a memory configured to store a three-dimensional (3D) clipmap data structure having at least one clip level and at least one mip level, wherein said 3D clipmap data structure comprises a mipmap data structure having a plurality of levels that span a scene and compose said at least one clip level and said at least one mip level, said plurality of levels respectively associated with a plurality of memory pages and said at least one clip level maps less than all of said plurality of memory pages; and
   a processor configured to generate voxelized data for a scene and cause said voxelized data to be stored in said 3D clipmap data structure.

2. The computing system as recited in claim 1 wherein said clipmap data structure has at least two clip levels and at least three mip levels.

3. The computing system as recited in claim 1 wherein said processor is further configured to center said voxelized data about a viewpoint.

4. The computing system as recited in claim 3 wherein said processor is further configured to regenerate said voxelized data if said viewpoint moves or an object in said scene changes.

5. The computing system as recited in claim 1 wherein said at least one clip level and a finest level of said at least one mip level contain an equal number of voxels.

6. A method of representing volumetric data for a scene, comprising:
   voxelizing said scene into a 3D clipmap centered about a viewpoint;
   storing said 3D clipmap in a clipmap data structure having at least one clip level and at least one mip level, wherein said 3D clipmap data structure comprises a mipmap data structure having a plurality of levels that span said scene and compose said at least one clip level and said at least one mip level, said plurality of levels respectively associated with a plurality of memory pages and said at least one clip level maps less than all of said plurality of memory pages; and
   employing said 3D clipmap in computing an effect for said viewpoint.

7. The method as recited in claim 6 further comprising:
   creating a 3D mipmap texture;
   storing said 3D clipmap in said 3D mipmap texture; and
   gaining access to said 3D clipmap in said 3D mipmap texture.

8. The method as recited in claim 7 wherein clip levels of said 3D clipmap occupy an equal quantity of memory.

9. The method as recited in claim 6 further comprising updating said 3D clipmap upon movement of said viewpoint.

10. The method as recited in claim 6 further comprising updating said 3D clipmap upon a change in an object in said scene.

11. The method as recited in claim 6 wherein said employing includes sampling levels of detail (LODs) of said 3D clipmap based on distance from said viewpoint.

12. The method as recited in claim 6 wherein said effect includes ambient occlusion.

13. A graphics processing subsystem, comprising:
a memory configured to store a three-dimensional (3D) clipmap having a plurality of levels of detail (LODs); and
a graphics processing unit (GPU) coupled to the memory and configured to:
voxelize a scene, thereby generating the 3D clipmap, including at least one clip level and at least one mip level, wherein said 3D clipmap data structure comprises a mipmap data structure having a plurality of levels that span said scene and compose said at least one clip level and said at least one mip level, said plurality of levels respectively associated with a plurality of memory pages and said at least one clip level maps less than all of said plurality of memory pages, and
cause the at least one clip level and the at least one mip level to be respectively written to the memory.

14. The graphics processing subsystem as recited in claim 13 wherein said GPU is further configured to voxelize said scene such that said at least one clip level is centered about a viewpoint in said scene.

15. The graphics processing subsystem as recited in claim 14 wherein said GPU is operable to employ said 3D clipmap to compute global illumination for said viewpoint.

16. The graphics processing subsystem as recited in claim 13 wherein each successively finer LOD of said plurality of LODs comprises a successively larger quantity of memory pages.

17. The graphics processing subsystem as recited in claim 16 wherein said GPU is further configured to map voxels of said at least one clip level to a subset of said successively larger quantity of said memory pages, thereby leaving a remainder of said successively larger quantity of said memory pages unmapped.

18. The graphics processing subsystem as recited in claim 17 wherein said 3D clipmap includes a plurality of clip levels and a plurality of mip levels, said plurality of clip levels each comprising an equal quantity of voxels that span regressively smaller spatial regions of said scene.

* * * * *